United States Patent [19]
Boltz et al.

[11] Patent Number: 6,081,731
[45] Date of Patent: Jun. 27, 2000

[54] SELECTIVE CARRIER DENIAL FOR MOBILE SUBSCRIBERS

[75] Inventors: David Boltz, Garland; Vladimir Alperovich, Dallas; Eric Valentine; Mahesh Patel, both of Plano, all of Tex.; Erkki Joensuu, Siuntio, Finland

[73] Assignee: Ericsson Inc., Research Triangle Park, N.C.

[21] Appl. No.: 08/768,812

[22] Filed: Dec. 18, 1996

[51] Int. Cl.$^7$ ............................................. H04Q 7/20
[52] U.S. Cl. ............................................. 455/565; 455/411
[58] Field of Search ............................ 455/433, 411, 455/435, 434, 521, 522, 550, 561, 565, 422, 417, 414, 518, 519, 415; 379/130, 199, 200, 221, 377, 386, 565

[56] References Cited

U.S. PATENT DOCUMENTS

| | | | |
|---|---|---|---|
| 4,908,848 | 3/1990 | Hanawa | 455/565 |
| 5,579,376 | 11/1996 | Kennedy et al. | |
| 5,621,783 | 4/1997 | Lantto et al. | 379/59 |
| 5,689,548 | 11/1997 | Maupin et al. | 455/466 |
| 5,745,852 | 4/1998 | Khan et al. | 455/433 |
| 5,815,808 | 9/1998 | Valentine | 455/435 |
| 5,845,211 | 12/1998 | Roach, Jr. | 455/560 |
| 5,884,193 | 3/1999 | Kaplan | 455/565 |
| 5,950,125 | 9/1999 | Buhrmann et al. | 455/422 |

FOREIGN PATENT DOCUMENTS

| | | |
|---|---|---|
| WO 93 18606 | 9/1993 | WIPO . |
| WO 96 09714A | 3/1996 | WIPO . |
| WO 96 13132A | 5/1996 | WIPO . |

Primary Examiner—William G. Trost
Assistant Examiner—Jean A. Gelin
Attorney, Agent, or Firm—Jenkens & Gilchrist, P.C.

[57] ABSTRACT

Selective carrier denial in a cellular system restricts some or all carrier-handled calls from a given cellular subscriber while simultaneously allowing other cellular calls. A restriction flag or indicator in a Visitor Location Register (VLR) of the cellular system is set by a Home Location Register (HLR) which contains a list of those carriers denied to subscribers. When the restriction flag is set, the HLR is interrogated to determine if the call is restricted. Alternatively, the restriction flag may reside within the subscriber's mobile phone. Further, the VLR or mobile phone may, respectively, contain a list of denied carriers and internally determine if carrier denial applies without resort to the HLR.

18 Claims, 6 Drawing Sheets

SELECTIVE CARRIER DENIAL FOR MOBILE SUBSCRIBERS

FIELD OF THE INVENTION

The present invention relates generally to a telecommunications system and method incorporating selective carrier denial, particularly, to a telecommunications system and method for selective carrier denial in a wireless environment, and, more particularly, to a system and method for selective carrier denial in a mobile cellular environment.

BACKGROUND AND OBJECTS OF THE PRESENT INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

The United States wireline network today has an equal access feature called Selective Carrier Denial (SCD), a feature that provides the capability for a telephone service provider at the request of a carrier, such as AT&T, to block subscriber access to toll calling on that carrier, but without restricting such subscribers from making local, non-toll calls or calls using other carriers. In particular, SCD allows the wireline provider to selectively inhibit certain carrier-handled calls from those subscribers who have been designated as non-paying subscribers, but allow them to make local and emergency calls without restriction.

The Federal Communications Commission (FCC) recently indicated that for safety and security reasons wireless providers in the United States will soon be required to incorporate equal access capability into their wireless systems. Currently, the SCD feature is not available in cellular systems in the United States, such as the PCS 1900.

It is, accordingly, an object of the present invention to implement the Selective Carrier Denial feature of wireline systems into wireless telephony systems, particularly those of the United States in accordance with the FCC's mandate.

It is a further object of the present invention to incorporate Selective Carrier Denial into cellular systems, restricting subscriber access to particular carriers, groups of carriers or all carriers.

SUMMARY OF THE INVENTION

A telecommunications system and method for selective carrier denial provides an operator of a Public Land Mobile Network (PLMN) the ability to restrict or inhibit certain carrier-handled calls from a given cellular subscriber, while simultaneously allowing other cellular calls. In one embodiment of the present invention, a restriction flag is included in a Visitor Location Register (VLR) record for each cellular user. When the user attempts to make a carrier-handled call and the restriction flag is set, the Home Location Register (HLR) for the PLMN determines whether the restriction applies and whether the selected carrier call should be denied. In another embodiment of the present invention, selective carrier denial is applied to intelligent network systems and methods. In still another embodiment of the present invention, selective carrier denial is applied within a subscriber's mobile phone without involving the HLR directly.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
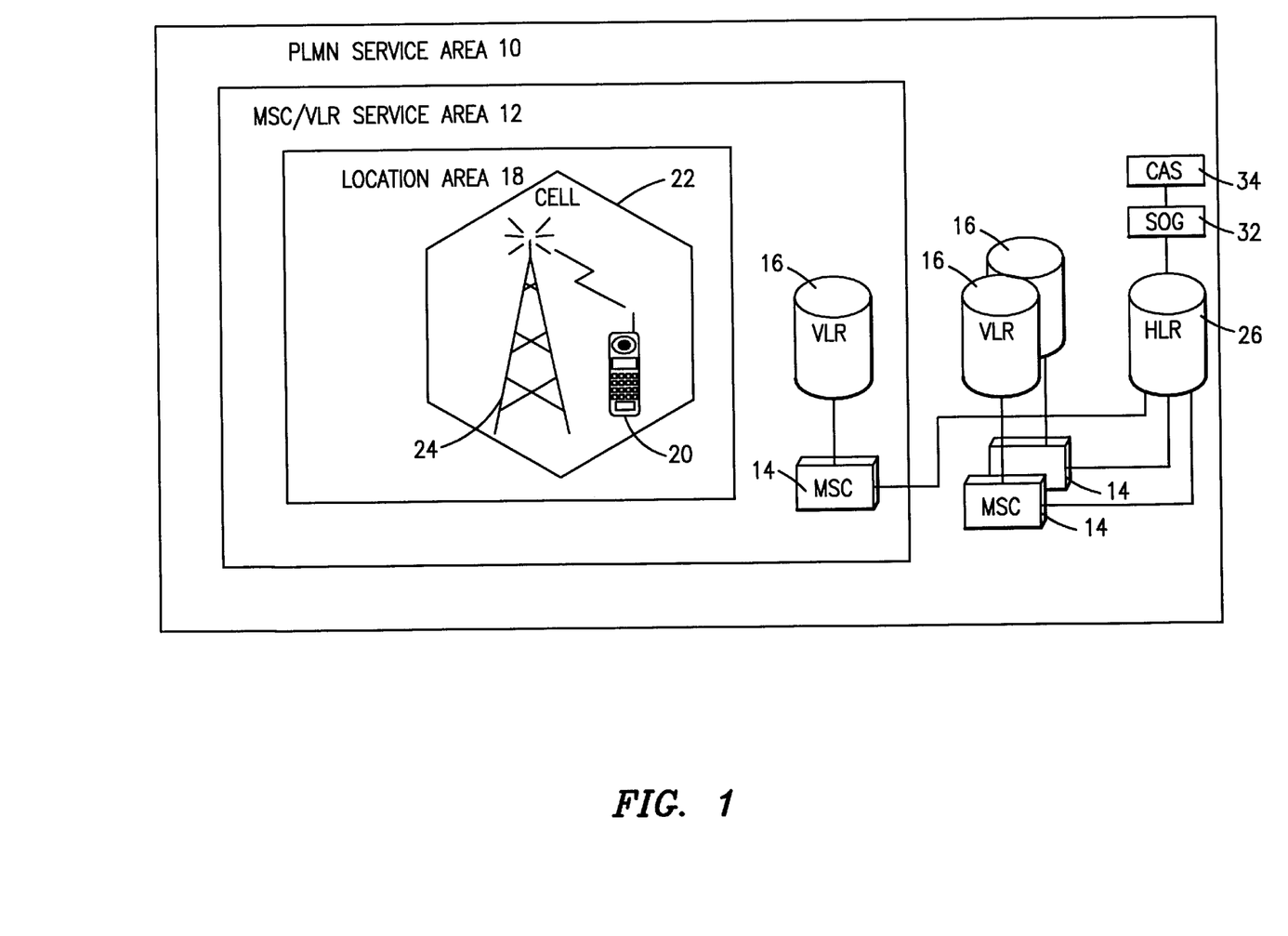
FIG. 1 is a block diagram of a telecommunications system according to a first and second embodiments of the present invention.

With reference to FIG. 1 of the drawings, there is illustrated a Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which is defined as that part of a given MSC/VLR area 12 in which a mobile station (MS) 20 may move freely without having to send update location information to the MSC/VLR area 12 that controls that LA 18. Each Location Area 12 is divided into a number of cells 22. Mobile Station 20 is the physical equipment, e.g., a car phone or other portable phone, used by mobile subscribers to communicate with the cellular network 10. A Base Station (BS) 24 is the physical equipment, illustrated for simplicity as a radio tower, that provides radio coverage to the geographical area of the cell 22 in which to handle radio traffic to and from the MS 20.

With further reference to FIG. 1, the PLMN Service Area or cellular network 10 includes a Home Location Register (HLR) 26, which is a database maintaining all subscriber information, e.g., user profiles, current location and routing information, International Mobile Subscriber Identity (IMSI) numbers, and other administrative information. The HLR 26 may be co-located with a given MSC 14, an integral part of the MSC 14 or service multiple MSCs 14, the latter of which is illustrated in FIG. 1. IMSI is a unique 15-digit identification number assigned to each mobile station 20, and includes a Mobile Country Code (MCC) of three digits, a Mobile Network Code (MNC) of two (or three) digits, and a Mobile Subscriber Identification Number (MSIN), the latter two constituting a National Mobile Subscriber Identity (NMSI) number.

The VLR 16 is a database containing information about all of the mobile stations 20 currently located within the MSC/VLR area 12. If a mobile station 20 roams into a new MSC/VLR area 12, the VLR 16 connected to that MSC 14 will request data about that mobile station 20 from the HLR database 26 (simultaneously informing the HLR 26 about the current location of the mobile station 20). Accordingly, if the user of the mobile station 20 then wants to make a call, the local VLR 16 will have the requisite identification information without having to reinterrogate the HLR 26.

In the aforedescribed manner, the VLR and HLR databases 16 and 26, respectively, contain various subscriber information associated with a given mobile station 20. In a first embodiment of the present invention, additional information for each subscriber is stored in these databases, particularly, carrier restriction information. In an alternate embodiment of the present invention, described and discussed infra, the carrier restriction information is forwarded to the subscriber's radiotelephone, e.g., mobile station 20, where it is stored.

Figure 2:
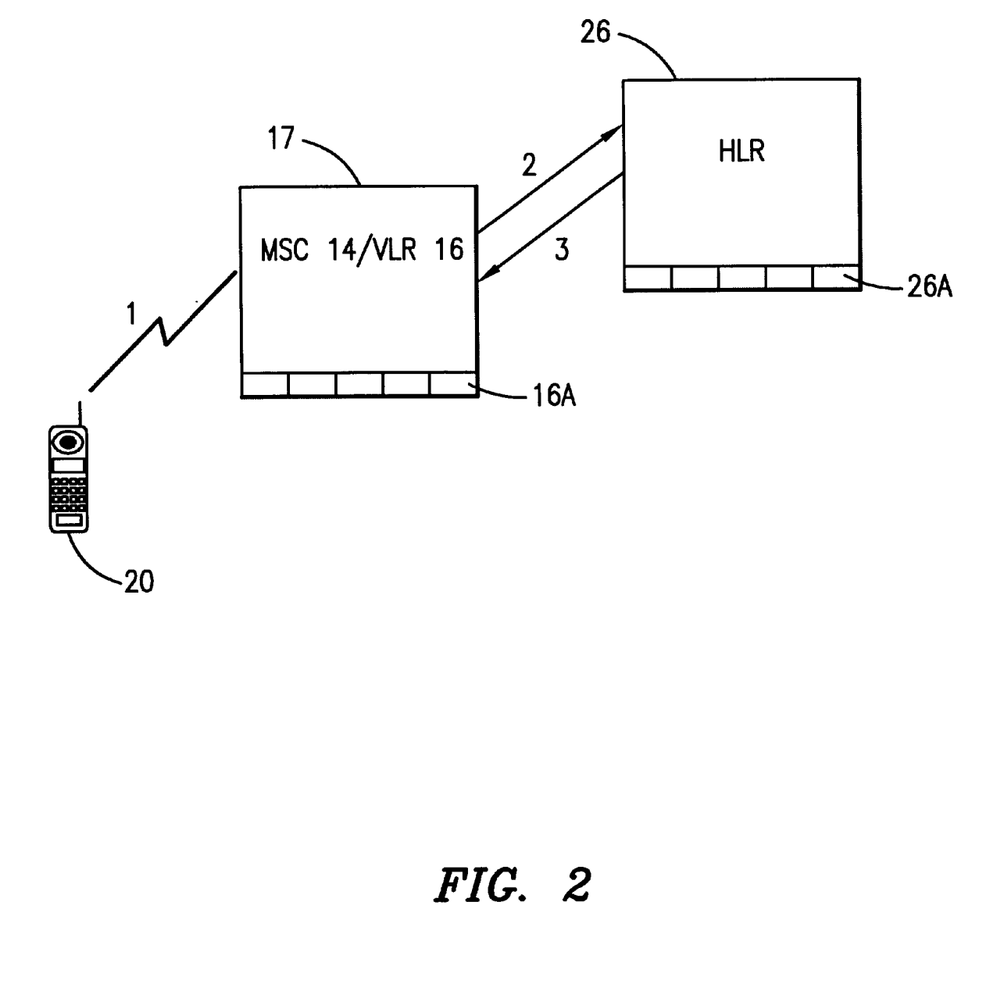
FIG. 2 is a block diagram of a portion of the telecommunications system shown in FIG. 1, illustrating the steps for setting a carrier restriction flag in the Mobile Services Switching Center (MSC)

With reference now to FIG. 2, there is shown a portion of the overall network 10 in FIG. 1 and a series of numbers representing a corresponding number of steps, as will be described hereinafter. The mobile station 20, upon powering up, initiates a registration message to the appropriate MSC/VLR (shown as an integrated device 17 in FIG. 2) in the MSC/VLR area 12 and registers the requisite information therein (step 1 as illustrated). The MSC/VLR 17 then signals the HLR 26 requesting the subscriber data associated with the particular registering device 20 (step 2). The HLR database 26, according to the first embodiment, includes a plurality of data records 26A of carrier restriction information on each subscriber, and forwards to the VLR 16 in device 17 (step 3) an instruction to set a restriction flag record 16A in the VLR database 16 if the particular subscriber has any applicable carrier restrictions. For example, if the subscriber has not paid their phone bill for a given carrier (and is deemed a non-paying subscriber by that carrier) the restriction flag 16A associated with that subscriber is set and the MSC/VLR 17 receives an affirmative indication from the HLR 26 that a restriction applies. The subscriber data, along with the set restriction flag 16A for that subscriber, is then stored within the VLR 16 for later use.

Figure 3:
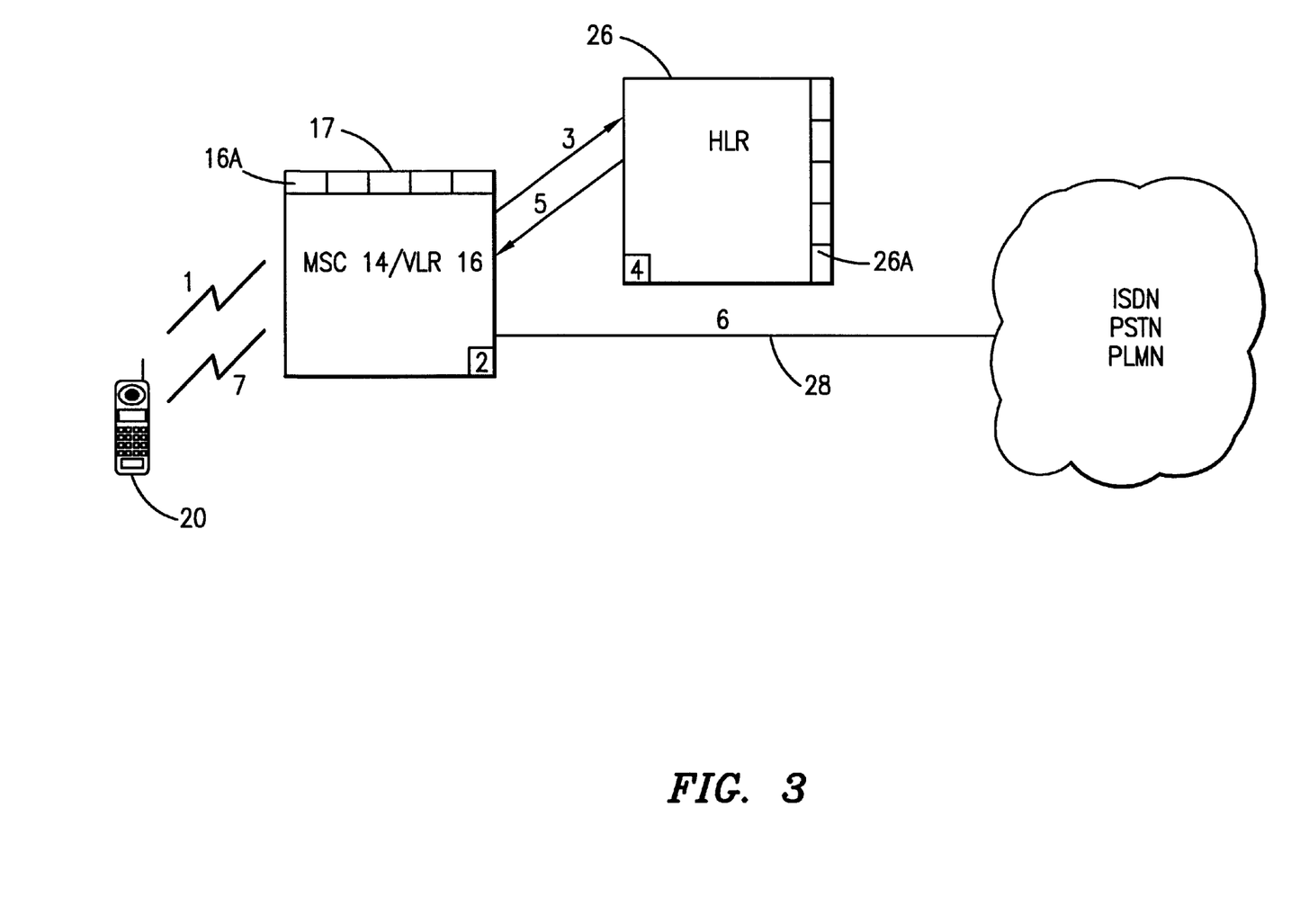
FIG. 3 is a block diagram of a portion of the telecommunication system shown in FIG. 1, illustrating the steps for selective carrier denial.

After the MS 20 has registered in the local MSC/VLR Service Area 12, i.e., information on the MS 20 is stored in the VLR database 16, the mobile station 20 may then attempt to initiate a call. With reference now to FIG. 3, there is shown the network portion as in FIG. 2 but with a communications link 28 to other systems, e.g., other MSC/VLR areas 12 within the PLMN or other PLMNs, a Public Switched Telephone Network (PSTN), an Integrated Services Digital Network (ISDN) or other wireline or wireless systems. After the MS 20 initiates the call (step 1, as illustrated) and establishes a link with the MSC/VLR (also shown as an integrated device 17 in FIG. 3), the MSC/VLR 17 determines whether or not a long distance, toll or carrier access call is requested (step 2).

If the call is local or if the restriction flag 16A for that subscriber is not set, then the call goes out to the proper destination either within the PLMN 10 or across link 28 (step 6, as illustrated in FIG. 3). If, however, the call is a carrier access or toll call, i.e., restrictions could apply to this particular call or type of call, and the restriction flag 16A is set, then more information is needed to ascertain whether this particular call by this particular subscriber is allowed. The MSC/VLR 17 signals the HLR 26 (step 3), forwarding the pertinent carrier identification information, e.g., for AT&T the number 288 representing their carrier code, to the HLR 26.

A carrier restriction function, also stored within the HLR 26, compares the carrier identification information forwarded by the MSC/VLR 17 with a list of restricted carriers for that subscriber (step 4) stored in the data record 26A for that subscriber. If the chosen cellular carrier can be used, i.e., the carrier identification does not match any of the stored restricted carriers or carrier types, then the HLR 26 signals the MSC/VLR 17 (step 5), which then completes the call, e.g., across link 28 (step 6). If, however, a match is found and the chosen cellular carrier is a restricted one, then the HLR 26 signals (step 5) the MSC/VLR 17 accordingly, which then rejects the call and sends the reason therefor back to the mobile station 20 (step 7) which displays an invalid carrier selection message to the subscriber.

It should be understood that the HLR 26 will also disallow or reject a definition of a call-forwarding number that uses a restricted carrier.

With further reference to FIG. 1, there is shown a Service Order Gateway (SOG) 32 connecting the HLR 26 with a Customer Administration System (CAS) 34, through which a network administrator may modify the HLR database 26, on a subscriber basis, to reflect changes in the subscribers' status. For example, if a given subscriber becomes a non-paying subscriber for one or more carriers, then a list of those non-allowed carriers is entered by the network administrator through the CAS 34 and SOG 32 and stored within the subscriber data records 26A of HLR database 26.

It should be understood that restriction flag 16A in the first embodiment of the present invention is preferably a generic flag, i.e., the flag 16A in MSC/VLR 17 only indicates that a generic carrier restriction has been placed on that subscriber, not a particular restriction. The particular restriction information is, as described, stored within the respective data record 26A of the HLR 26 for that subscriber. It should nonetheless be understood that a multiplicity of discrete restriction flags 16A may be available for each subscriber which indicate a corresponding multiplicity of particular restrictions. For example, flag $16A_1$ in VLR 16 may indicate an AT&T restriction, flag $16A_2$ a SPRINT restriction, etc., or flag $16A_1$ may indicate the allowance or restriction of types of carrier-access calls, described in more detail hereinafter.

It should also be understood that in a second embodiment of the present invention the HLR 26 may forward a list of carrier restrictions about a particular subscriber for storage within the appropriate VLR 16. For example, a multibit or multiword flag or data record representing the particular carrier restrictions or carrier restriction types may be downloaded to the VLR 16, which could then perform the appropriate comparison, i.e., the aforementioned carrier restriction function, at that point without involving the HLR 26. Alternatively, where the number of carriers is excessive, a partial list may be downloaded, preferably the most likely candidates to be accessed. In either event, complete, partial or particular updates to the VLR 16 are periodically necessary to maintain accurate subscriber restriction information.

It should further be understood that the above embodiments of the present invention may be adapted for related usages, e.g., to provide selective carrier denial capability to an intelligent network (IN) such as a freephone service, i.e., a service whereby a company has a universal number to which all incoming calls to that company are charged. When this number is dialed, irrespective of the caller's location in the country, the call is automatically routed to the nearest or most appropriate office of the company, e.g., a central office open around the clock or a regional office open on weekdays during normal hours. Selective Carrier Denial may be employed in the manners described in the present application to restrict a caller's access to the universal number, thereby avoiding a charge to that number by an ineligible dialer.

Figure 4:
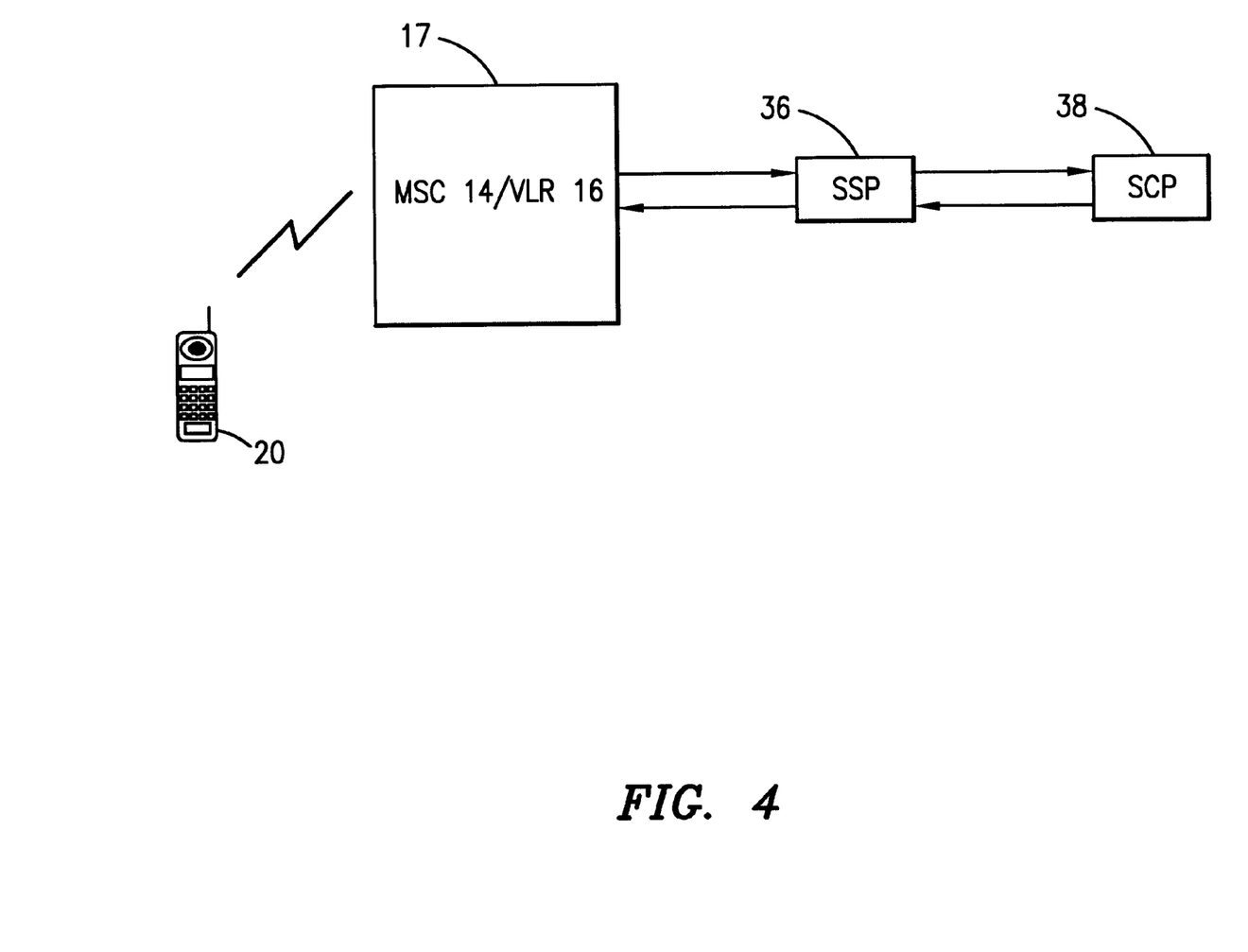
FIG. 4 is a block diagram of a third embodiment of the present invention.

Shown in FIG. 4 is a third embodiment of the present invention directed to incorporating SCD capability into an IN cell, as described above. In particular, after the MSC/VLR 17 identifies the call as an IN call, the call is then routed to the nearest Service Switching Point (SSP) 36, which has conventional Service Switching Functions (SSF) therein, such as set forth in triggering tables. The SSP 36 communicates with a Service Control Point (SCP) 38, which contains Service Control Functions therein, which include the requisite routing and determination functions for SCD, such as those incorporated into the data records 26A of the HLR 26 in the first embodiment. For example, after the MSC/VLR 17 routes a subscriber's call to the SSP 36, the carrier identification is then forwarded to the SCP 38, which analyzes the carrier identification and determines if there are any restrictions. If none, the call goes through. If restrictions apply, a message is forwarded back to the MSC/VLR 17 that the call has been denied.

Figure 5:
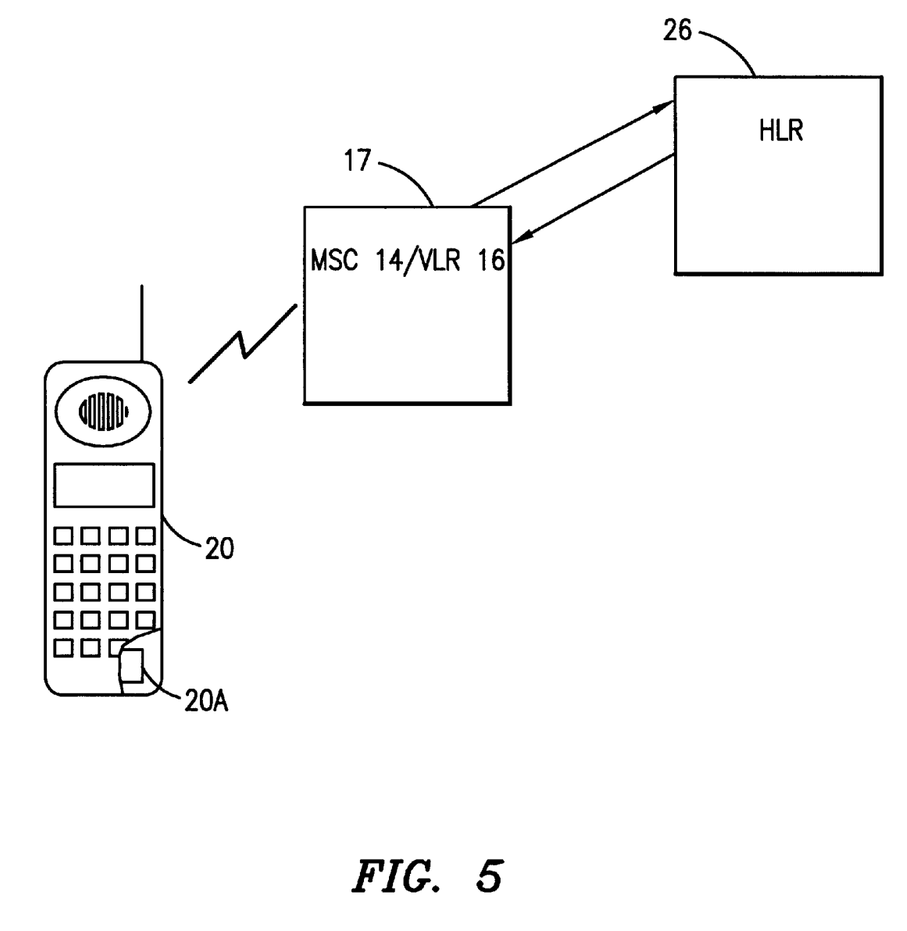
FIG. 5 is a block diagram of a fourth embodiment of the present invention.

Shown in FIG. 5 is a fourth embodiment of the present invention directed to incorporating carrier restriction capability into a database 20A within the mobile station 20. Database 20A, which may reside, for example, in a conventional Subscriber Identity Module (SIM) Card, may include therein a carrier restriction flag, which if set indicates that more particular carrier restriction information is required, as described. Alternatively, a multiplicity of flags representing a corresponding multiplicity of carrier restrictions or a carrier restriction list, as in the second embodiment, may be downloaded, from the HLR 26 database through the respective MSC 14, to the mobile station 20 for storage within database 20A. In this manner, the carrier restriction function may be performed within the mobile station 20 itself without using any over-the-air resources of the PLMN 10. For example, if the database 20A indicates that a carrier restriction applies and the subscriber dials an initial "10", i.e., an attempt to place a toll call, then the attempt is terminated at the mobile station 20 without involving the network.

It should be understood that the method and system of the present invention is also useful where different protocols come into contact, e.g., PCS 1900 and GSM. In this scenario, the MSC/VLR 17 in one system, e.g., the PCS 1900 in the United States, contacts the HLR 26 of another, e.g., the GSM of Europe, and, through use of the IMSI identification numbers, selective carrier denial information is exchanged.

It may be said that the aforedescribed embodiments provide selective carrier denial capability to a telecommunications system, selectively denying carrier access on a case-by-case basis in accordance with the restriction flag records 26A, 16A or 20A stored in the HLR 26, the VLR 16 or MS 20, respectively. Another variant on this theme is restricting call access at a broader level, e.g., all toll calls or particular types of carrier access calls, referred to herein as restricted carrier denial, described hereinafter.

With reference again to FIG. 1 of the drawings, a mobile subscriber in the PLMN 10 system, such as PCS1900, may subscribe to a Presubscribed inter-Local Access Transport Area (InterLATA) Carrier (PIC) in that system. This carrier information is then placed by the network administrator within the appropriate record 26A of the HLR 26, also referred to as the subscriber profile data. The mobile subscriber, represented by mobile station 20 in the figures, has the option to override their own PIC, i.e., the assigned carrier, on a per call basis by dialing a Carrier Access Code (CAC) in front of the B-number. Further, cellular phone rental companies may require the user to use only the designated carrier (PIC) on their phones and bar the user from making CAC calls.

Figure 6:
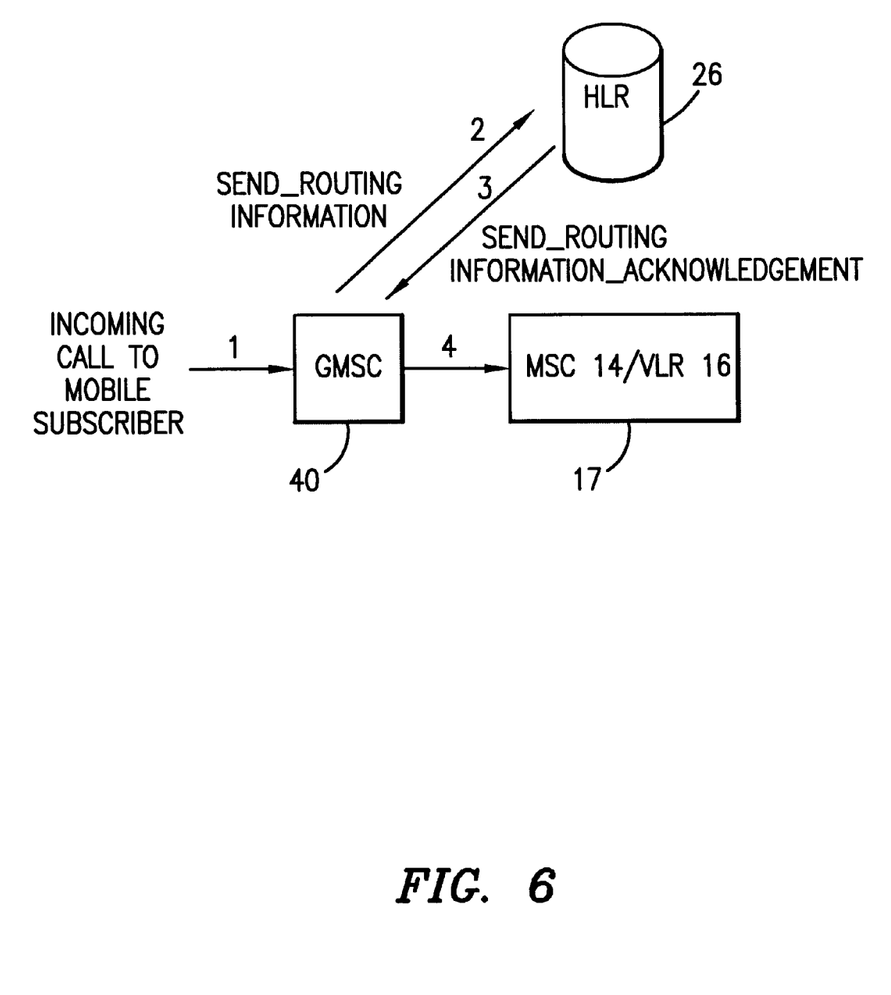
FIG. 6 is a block diagram of an alternate embodiment of the present invention.

It should be understood that the MSC 14/VLR 16 servicing that mobile subscriber has the capability to use a default carrier in the event a particular PIC or CAC is not defined for that MSC 14/VLR 16 and substitution with the default carrier is allowed. In this manner, the subscriber of the mobile station 20 can make both interLATA,intraLATA and other toll calls without any restrictions. Similarly, a Gateway MSC (GMSC) 40, servicing calls to the mobile subscriber, as shown in FIG. 6, may also use a default carrier where a particular PIC or CAC is not provided. In this manner, a call originating from the mobile subscriber (or call forwarding) and terminating thereat that requires a carrier connection will be routed to the relevant carrier according to the CAC, PIC or default carrier indicated and in that order.

When the mobile subscriber roams between cells 22, Location or Service Areas 18 or 12, respectively, or otherwise within the PLMN Area 10, location updates are periodically performed, updating the HLR 26 as to the subscriber's location. Updates are also performed when powering-up the MS 20, as described. For example, the response from the HLR 26, step 3 as illustrated and described in connection with FIG. 2, forwards a conventional Insert_Subscriber_ Data command which, according to the instant embodiment of the present invention, includes a representation of the carrier capability currently available to that mobile subscriber, e.g., only PIC calls.

It should be understood that the PIC information may be entered into the HLR 26 through the CAS 34 and SOG 32, as illustrated and described in connection with FIG. 1, updating the HLR 26 database accordingly. It should also be understood that the GMSC 40, coordinating a call to the mobile subscriber, i.e., mobile station 20, will interrogate the HLR 26 and the pertinent data records 26A therein as to the subscriber's current location within the PLMN 10, the roaming number of the MS 20, and the applicable PIC or other carrier code applicable to that called subscriber, all of which information are forwarded to the GMSC 40.

In more detail and with reference to FIG. 6, the GMSC 40 receives an incoming call (step 1 as illustrated) to the aforementioned mobile subscriber and requests (step 2) routing information as to that subscriber from the HLR 26, which forwards (step 3) the aforedescribed location and carrier information to the GMSC 40, which makes the necessary connections and forwards this information to the pertinent MSC 14 and VLR 16 for that locale (step 4) if no pertinent restrictions apply for that subscriber.

In the aforedescribed manner, broad restrictions may be placed upon a mobile subscriber or user as to particular types of calls, e.g., all carrier-restricted calls, whereas the aforedescribed selective carrier denial embodiments are primarily directed to restricting communications via particular carriers. Although the selectively restrictive embodiments described above provide a more flexible carrier denial solution, one advantage of this embodiment of the present invention, the fifth, is greater ease of implementation. For example, by use of broad categories of restrictions, there is no, need to deal with the hundreds, thousands or even tens of thousands of different carriers, and the consequent memory consumption and complex administration requirements associated therewith. Additionally, no new communication protocols are necessary and existing protocols, such as Mobile Application Part (MAP) signaling, may be used, e.g., the aforementioned Insert_Subscriber_Data MAP command by which the HLR 26 forwards subscriber data including the carrier restriction code.

It should, accordingly, be understood that the data records 26A, the restriction flag information 16A and restrictive information in database 20A may, instead of each constituting a discrete new record, each constitute a portion of the subscriber profile data stored in the HLR 26 or downloaded therefrom to the VLR 16 or MS 20, respectively, in accordance with the description set forth in connection with the previous embodiments.

In accordance with this fifth embodiment of the present invention, a carrier restriction code, flag or indicator is added to the subscriber profile data protocol, said indicator indicating the particular type of carrier restriction applicable for that subscriber. As discussed, the indicator is stored, along with the other subscriber profile data, in the HLR 26 and passed to the VLR 16 in the aforementioned Insert_Subscriber_Data message. With reference to the subscriber call terminating scenario in FIG. 6, the indicator and other information is forwarded from the GMSC 40, which got it from the HLR 26 in a Send_Routing_Information_Acknowledgement signal, to the pertinent VLR 16 in the subscriber's current locale.

Operation of this carrier denial embodiment of the present invention in the call origination context is as follows. When the MS 20 originates a call that requires a carrier, the MSC 14/VLR 16 will check the indicator, e.g., flag 16A, for a restriction. If no restrictions are indicated, default handling applies and the call proceeds in a conventional manner. If the indicator flag 16A indicates that no carrier calls are allowed at all, then the attempted call is released and an appropriate announcement forwarded to the subscriber or user. If the indicator flag 16A indicates that carrier calls are allowed on PIC only, then no other carriers may be used. Accordingly, if a PIC call is made, the call proceeds in a conventional manner as described, but, if a CAC or other toll call is attempted, then the call is terminated and the appropriate announcement made.

Similarly, in the call termination context, when the GMSC 40 receives an incoming call, which must be forwarded to the pertinent MSC 14 across a carrier to an MS 20, carrier restrictions may apply. The GMSC 40 first interrogates the HLR 26, i.e., forwards a Send_Routing_Information request as shown in FIG. 6, which responds with the profile data including the indicator for that subscriber. If no restrictions apply, the call proceeds conventionally. If no carrier calls are allowed, the call is terminated. If the call is made on an allowed carrier, then the call proceeds, else it, too, is terminated. For example, if the mobile subscriber's "home" is in Los Angeles and the subscriber is currently roaming in New York, then a call to the subscriber proceeds from the GMSC 40 in Los Angeles to the pertinent MSC 14/VLR 16 in New York through a carrier, i.e., long distance. The carrier used in such instance will either be PIC or a default carrier in that order.

It should be understood that, although the number of different applicable carrier restrictions is preferably small in number, the number of such restrictions may be of any size. However, it is preferred that the number be small enough to be compatible with storage within the existing protocol mechanisms, such as MAP signaling.

It should also be understood that the aforedescribed indicator may be resident within the database 20A of the MS 20. In this manner, calls originating from the MS 20 may be screened before entering the network 10. In other words, if there are no restrictions indicated within the database 20A, default handling applies and the call proceeds through to the network 10. If all carrier calls are restricted, the call terminates there with the appropriate announcement to the user such as on a display. Lastly, if only PIC calls are allowed, only PIC calls enter the network 10. CAC or other toll calls are terminated at the source in the aforedescribed manner.

It should further be understood that the aforedescribed indicator in the database 20A of the MS 20 may refer to the HLR 26 for a determination whether the particular carrier-access cellular call in question is restricted, i.e., by reference to the database 26A, or refer to the database 16A within the respective VLR 16 to make that determination without going further and involving the HLR 26 and other system resources.

The previous description is of preferred embodiments for implementing the invention, and the scope of the invention should not necessarily be limited by this description. The scope of the present invention is instead defined by the following claims.

What is claimed is:

1. A cellular communications system having a home location register, a plurality of visitor location registers in communication therewith, and a mobile station in communication with a respective one of said visitor location registers through a mobile switching center, circuitry within said cellular communication system for carrier denial, said circuitry comprising:

a carrier restriction database, within said home location register, for indicating the carrier restrictions applicable for said mobile station; and selective carrier restriction means, in communication with said carrier restriction database of said home location register, for selectively restricting a carrier-access cellular call of said mobile station, wherein said selective carrier restriction means comprises:

an indicator flag, within said respective visitor location register, for indicating a carrier restriction for said mobile station, said indicator flag being set through communication with said home location register; and carrier restriction function means, within said home location register, for determining whether said carrier-access cellular call of said mobile station is restricted by the applicable carrier restrictions within said carrier restriction database, carrier information associated with said carrier-access cellular call being forwarded to said home location register for said determination when said indicator flag is set, said carrier restriction function means matching said carrier information against the applicable carrier restrictions within said carrier restriction database.

2. The cellular communications system according to claim 1, wherein said indicator comprises a flag indicative of a particular carrier restriction applicable to said mobile station.

3. The cellular communications system according to claim 2, wherein said particular carrier restriction indicates no carrier-access calls for said mobile station.

4. The cellular communications system according to claim 1, wherein said indicator comprises a flag indicative of a multiplicity of discrete applicable carrier restrictions.

5. The cellular communications system according to claim 1, wherein said home location register communicating with said respective visitor location register through the transference from said carrier restriction database of subscriber profile data about a mobile subscriber associated with said mobile station thereto, said indicator comprising a portion of said data.

6. The cellular communications system according to claim 1, wherein said carrier-access cellular call originates from said mobile station.

7. The cellular communications system according to claim 1, wherein said carrier-access cellular call terminates at said mobile station.

8. The cellular communications system according to claim 1, wherein said carrier-access cellular call is part of an Intelligent Network communication.

9. The cellular communications system according to claim 1, wherein said carrier restriction means allows non-carrier-access cellular calls to pass.

10. The cellular communications system according to claim 1, wherein said mobile station is restricted to use of a single carrier within said cellular communications system.

11. The cellular communications system according to claim 1, further comprising:
   updating means, in communication with said home location register, for updating said carrier restriction database.

12. A method for selective carrier denial in a cellular communications system having a home location register, a plurality of visitor location registers in communication therewith, and a mobile station in communication with a respective one of said visitor location registers through a mobile switching center, a carrier restriction database within said home location register for indicating the carrier restrictions applicable for said mobile subscriber, and an indicator within said system, said indicator in communication with said carrier restriction database within said home location register, said indicator being set if carrier restrictions for said mobile station apply, said method comprising the steps of:
   determining, upon occurrence of a carrier-access cellular call, whether said indicator is set;
   if said indicator is determined to be set:
      forwarding a carrier identifier for said carrier-access cellular call to said home location register; and
      determining, within said home location register, if said carrier identifier matches a restricted carrier identifier for said mobile station in said carrier restriction database, said carrier-access cellular call being denied if said carrier identifier matches said restricted carrier identifier, and said carrier-access cellular call proceeding if no match occurs;
   otherwise said carrier-access cellular call proceeding.

13. The method according to claim 12, wherein said indicator is within said respective visitor location register.

14. The method according to claim 12, wherein said indicator is within said mobile station associated with a mobile subscriber.

15. A method for selective carrier denial in a cellular communications system having a home location register, a plurality of visitor location registers in communication therewith, and a mobile station in communication with a respective one of said visitor location registers through a mobile switching center, a carrier restriction database within said home location register for indicating the carrier restrictions applicable for said mobile station, and an indicator within said respective visitor location register for indicating at least one carrier restriction applicable to said mobile station, said method comprising the steps of:
   determining, upon occurrence of a carrier-access cellular call, the carrier identifier for said carrier-access cellular call; and
   comparing the carrier identifier with said at least one carrier restriction within said indicator, said carrier-access cellular call being denied if said carrier identifier matches one of said at least one carrier restrictions within said indicator, and said carrier-access cellular call proceeding if no match occurs.

16. A method for selective carrier denial in a cellular communications system having a home location register, a plurality of visitor location registers in communication therewith, and a mobile station in communication with a respective one of said visitor location registers through a mobile switching center, a carrier restriction database within said home location register for indicating the carrier restrictions applicable for said mobile station, and an indicator within said mobile station associated with a mobile subscriber, said indicator indicating at least one carrier restriction applicable to said mobile station, said method comprising the steps of:
   determining, upon occurrence of a carrier-access cellular call, the carrier identifier for said carrier-access cellular call; and
   comparing the carrier identifier with said at least one carrier restriction within said indicator, said carrier-access cellular call being denied if said carrier identifier matches one of said at least one carrier restrictions within said indicator, and said carrier-access cellular call proceeding if no match occurs.

17. A cellular communications system having a home location register, a plurality of visitor location registers in communication therewith, and a mobile station in communication with a respective one of said visitor location registers through a mobile switching center, comprising:
   a carrier restriction database, within said home location register, for indicating the carrier restrictions applicable for said mobile station;
   an indicator, within said respective visitor location register, for indicating a plurality of carrier restrictions applicable to said mobile station, said indicator being set through communication with said home location register; and
   carrier restriction function means, within said respective visitor location register, for determining whether said carrier-access cellular call of said mobile station is restricted by the applicable carrier restrictions within said indicator, said carrier restriction function means matching the carrier information associated with said carrier-access cellular call against the applicable carrier restrictions within said indicator.

18. A cellular communications system having a home location register, a plurality of visitor location registers in communication therewith, and a mobile station in communication with a respective one of said visitor location registers through a mobile switching center, comprising:
   a carrier restriction database, within said home location register, for indicating the carrier restrictions applicable for said mobile station;
   an indicator, within said mobile station, for indicating a plurality of carrier restrictions applicable to said mobile station, said indicator being set through communication with said home location register; and
   carrier restriction function means, within at least one of said mobile station, said respective visitor location register and said home location register, for determining whether said carrier-access cellular call of said mobile station is restricted by the applicable carrier restrictions within said carrier restriction database, carrier information associated with said carrier-access cellular call being forwarded to said carrier restriction function means for said determination when said indicator flag is set, said carrier restriction function means matching the carrier information against the applicable carrier restriction within said carrier restriction database.

* * * * *